UNITED STATES PATENT OFFICE.

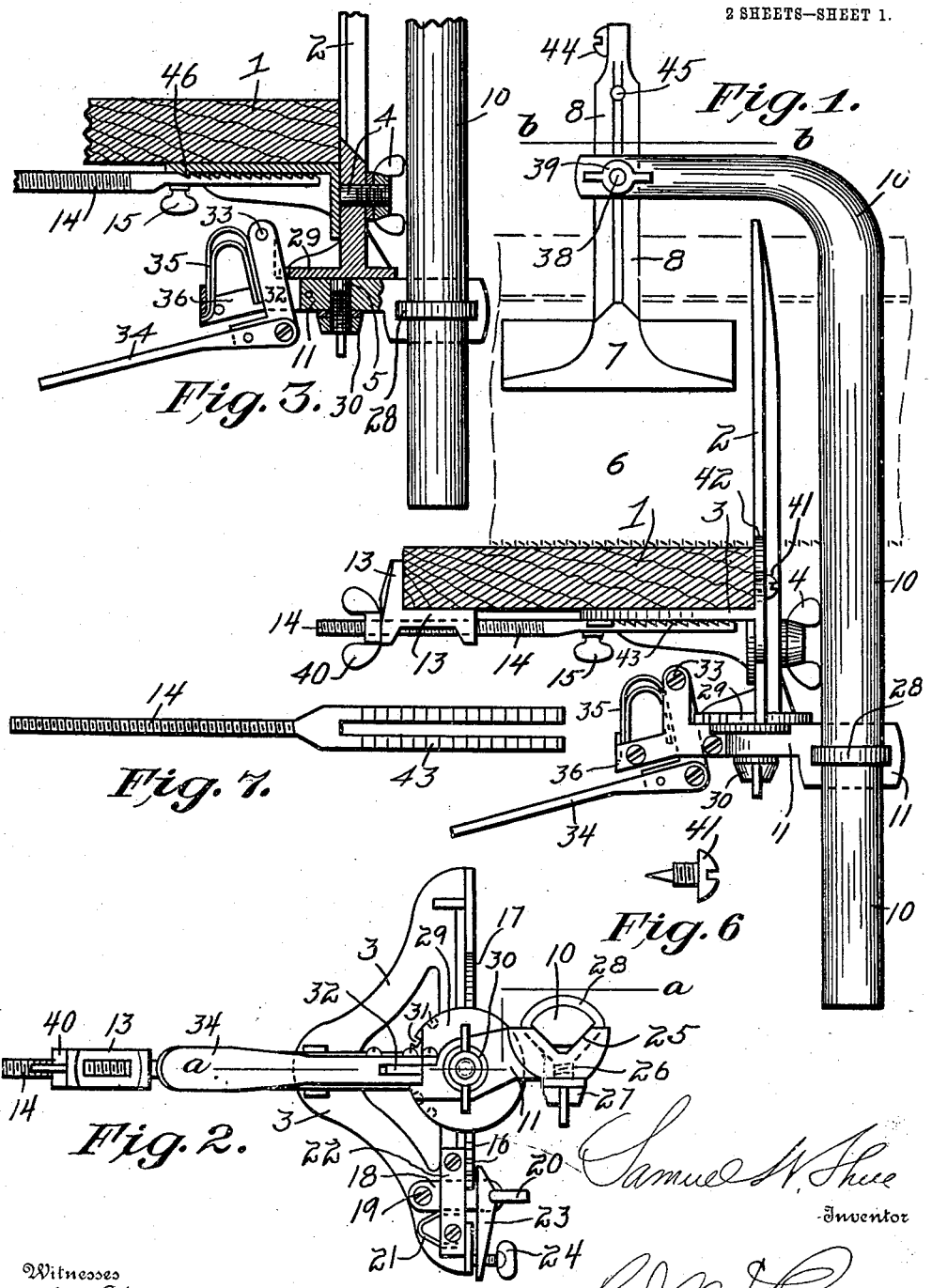

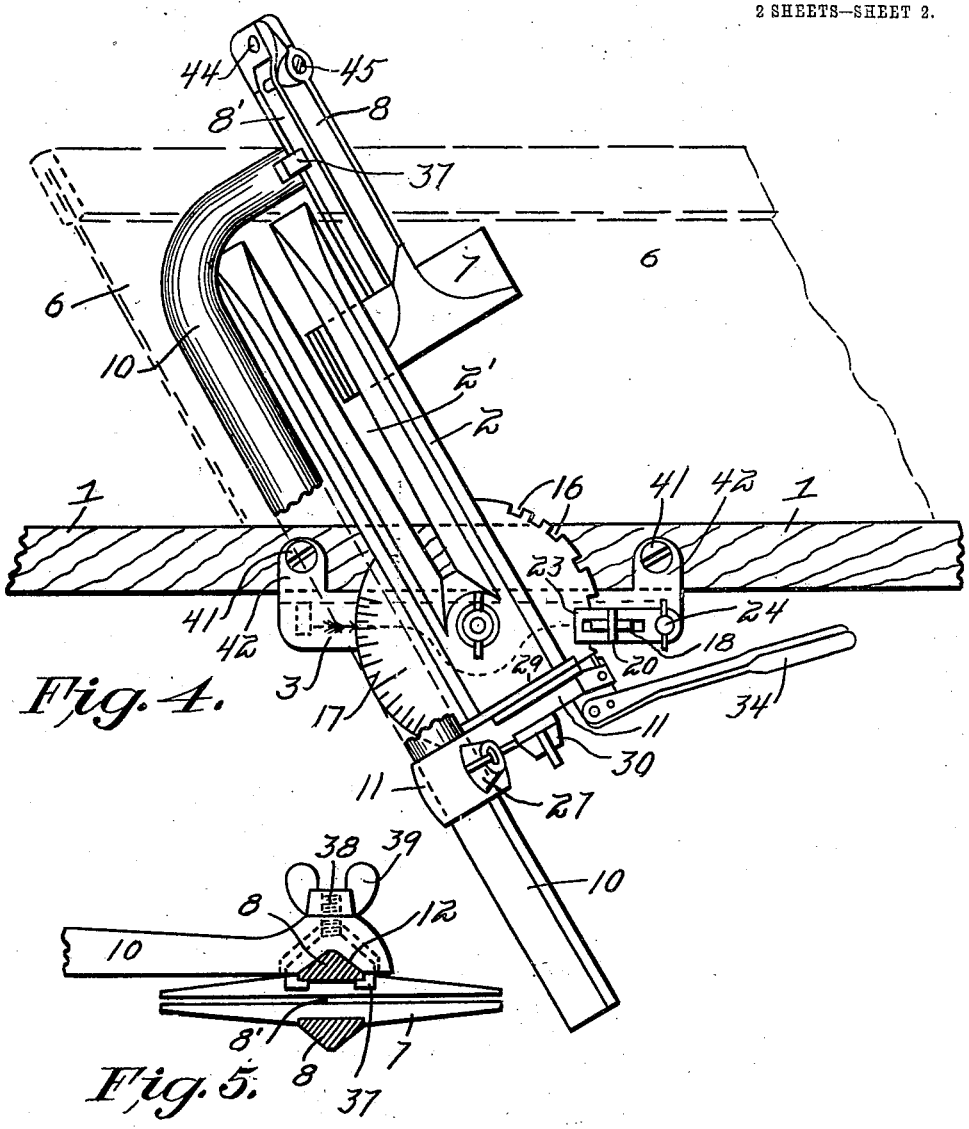

SAMUEL W. SHUE, OF DAYTON, OHIO.

MITER-BOX.

No. 903,901.     Specification of Letters Patent.     Patented Nov. 17, 1908.

Application filed March 16, 1908. Serial No. 421,421.

*To all whom it may concern:*

Be it known that I, SAMUEL W. SHUE, citizen of the United States, residing at Dayton, in the county of Montgomery and State of Ohio, have invented certain new and useful Improvements in Miter-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in miter boxes of the character shown and described in Letters Patent No. 795,371, granted to myself July 25, 1905.

The object of the invention and the structural features thereof which are involved may be briefly stated to consist of a construction by and through which the saw guide and the work table devices are supported upon a single member comprising a main supporting arm and upon which said saw guide and work table devices are adjustable toward and from each other. The saw guide may be more accurately adjusted to accommodate different thicknesses of saws, either hand saws or back saws, such adjustments being obtained through means of a set screw at the top of the saw guide extensions. Such top adjustment of the saw guide allows the same to have the necessary spring quality to permit the saw to move easily within the guide while at the same time the saw is held up properly through the tension applied to the saw guide extensions by the adjustable set screw.

In the present invention, the arrangement of levers for locking the device in position is more accurate and reliable, and the means for clamping the miter box onto the work board or table is a feature of special advantage.

Preceding a detail description of the invention, reference is made to the accompanying drawings, of which—

Figure 1, is a side elevation of the miter box, the table-board or the board to be operated upon appearing in section, and a portion of the saw appearing in dotted lines. Fig. 2, is a bottom plan view of the device, the board being removed. Fig. 3, is a sectional view on the line *a a* of Fig. 2. Fig. 4, is a rear elevation with the device moved on both pivots. Fig. 5, is a sectional view on the line *b b* of Fig. 1. Fig. 6, is a detail of a special screw for engaging the work-board. Fig. 7, a detail view of the adjusting device of the work table.

In a detail description of the invention, similar reference characters indicate corresponding parts.

The vertical back rest 2 has a longitudinal saw slot 2'. The material to be operated upon by the saw 6, which is shown in dotted lines in Figs. 1 and 4, is held against this back rest. The lower portion of said back rest has a circular form or portion, one edge of which is provided with a suitable number of square notches 16 which coöperate with other devices for holding said back rest in any of its angles of position on either side of a perpendicular position. The other side of the circular portion of said back rest is provided with a series of graduations 17 which indicate the angles of position of the back rest when moved out of a perpendicular position.

Coöperating with the notches 16 in the back rest is a detent 18 which is pivoted to the base 3 at 19, and said detent has a handle portion 20 by which it is moved out of said notches in order to adjust the back rest to the desired position. The detent 18 is normally held in the notches by means of a spring 21; the spring and detent are maintained in operative positions by means of a plate 22 which is secured to the base.

It will be observed that the notches 16 in the back rest are of varying distances apart, so that said back rest may be held in any of the desired positions. Other means are provided for holding the back rest in position whenever it may be desired to adjust it to positions between the notches; these means comprise a bifurcated clamping plate 23 which straddles the detent 18 and projects over the lower portion of the back rest. Passing through this clamping plate 23 is a thumb screw 24 which enters a right angled portion of the base 3. By means of this screw, the clamping plate 23 may be clamped against the back rest and made to hold the same in position. The base 3 is joined to the back rest 2 by a pivot 4 comprising a screw with a winged head with intervening washer. The screw projects from the base portion 3 through the lower circular portion of the back rest, and it is upon this pivot that the back rest is moved to the position shown in Fig. 4 or any other position. The back rest supports the base 3 by this connection, and both back rest and base are supported upon an arm 11 the rear end of which has a V-shaped recess 25 which receives the side of the saw guide arm 10.

The saw guide arm is provided with a matching V-shaped surface to provide a substantial friction grip between the saw guide arm and the arm 11, said friction grip being maintained by means of a binding screw 26 and a thumb nut 27. The binding screw is in the form of a band 28 which surrounds the saw guide arm 10.

The lower end of the back rest 2 terminates in a plate 29 from which projects a screw or threaded extension 5 which penetrates an opening in the arm 11 and receives a nut and washer 30. The back rest 2 is supported on the arm 11, together with the base 3, and the said arm 11 has a movement on the pivot formed by the screw 5, and it may be turned in the desired position and held by means of a series of notches 31 in the base plate 29 which are engaged by a detent 32 pivoted at 33 and connected to a hand lever 34; the hand lever 34 is operated to withdraw the detent 32 from the notches 31 to permit the saw guide arm to be turned on the pivot 5. The detent 32 is normally held in one or the other of the notches 31 by means of a spring 35 fastened to a support 36 and pressing against said detent 32. The upper end of the saw guide arm 10 is extended forwardly substantially at a right angle and supports the saw guide comprising two plates 7 7 with an intervening space through which the saw moves. The plates 7 7 are joined to extensions 8 which are connected at their upper ends by a screw 44. Elongated slots 8' extend nearly the length of said extensions, and penetrating these slots near their upper ends is an adjusting screw 45 by means of which the saw guide plates 7 are given the desired adjustment for whatever thickness of saw that is used.

The outer sides of the standards 8 8 are substantially of V-shape as at 12—Fig. 5, and a friction connection is made between the saw guide extensions 8 and the overhanging portion of the saw guide arm 10 by means of a binding yoke 37 which engages one of the extensions 8 and has a screw 38 extending therefrom which receives a thumb nut 39 by which the saw guide standard is clamped to the saw guide arm. It will be seen that the saw guide has a vertical adjustment by means of the screw 38 and thumb nut 39 and the longitudinal slots 8' in the saw guide extensions. It will also be seen that the work resting upon the table or board 1 may have a relative adjustment with the saw guide through the band screw 26 28 as before described, such adjustment being vertical as is also the independent adjustment which may be given the saw guide itself.

The work table or board before referred to, is supported upon the base 3 and held against the back rest 2 by means of a clamp 13 which passes loosely over a screw 14. This clamp is held against the outer edge of the work table 1 by means of a thumb nut 40. The clamp 13 is an angular piece, one portion of which supports the work table or board 1, and the other portion of which embraces the outer edge of said work table or board. The screw 14 has its rearward end bifurcated and provided with teeth 43 which engage a tooth 46, on the lower side of the middle portion of the base 3—see Fig. 3. The engagement between these teeth is maintained by means of a screw which projects from the base 3 and passes through the forked end of the screw 14 and receives a thumb nut 15. By loosening this thumb nut, the parts may be separated and re-adjusted to lengthen or shorten the length of said screw 14 to suit the width of the work table.

41—Fig. 6, designates a special form of screw pointed to penetrate the edge of the work table which lies against the back rest. There may be two or more of these screws which pass through the vertical extended portions 42 of the base; said screws serve to pin the work table 1 and hold the rear edge thereof firmly while the saw is operating upon it.

From the foregoing description and the drawings, it will be apparent that the saw guide arm 10 may be swung both ways on the pivot 5 and that the work table may be adjusted vertically upon the saw guide arm, and further, that the saw guide has an independent adjustment on the saw guide arm to and from the work table, such adjustment being co-extensive with the length of the slots in the extended portion of the saw guide. The saw guide plates 7 and the extended portions are rigidly connected, and the adjustment upon the saw guide arm is considerable, owing to the extended portions of the saw guide.

I claim:

1. In a miter box, a back rest and a base for the work table, said back rest and base being united by a horizontal pivot upon which the back rest is movable on either side of a perpendicular position, a supporting member for said back rest and base, a saw guide arm supporting the back rest and base by a pivotal connection with the lower terminal of the back rest and said supporting member, said saw guide arm having its upper end over-hanging the back rest, and a saw guide having extended portions with longitudinal slots, an adjusting screw penetrating said slots and the over-hanging portion of the saw guide arm, and a tension screw penetrating the extensions of the saw guide and adapted to regulate the space between the saw guide.

2. In a miter box, a slotted back rest having a horizontal base, a work table base united to the back rest by a horizontal pivot upon which the back rest is movable on either side of a perpendicular position, a saw guide arm having its upper end over-hanging the back rest, a supporting member clamped to the saw guide arm and adjustable there-along, a vertical pivot connecting said supporting member with the horizontal base of the back rest and upon which the saw guide arm is movable in arcs of a circle, a saw guide having slotted extensions and adjustably supported on the overhanging end of the saw guide arm, and adjustable means coöperating with the work-table base for supporting the work table.

3. In a miter box, a slotted back rest having its lower portion provided with notches and terminating at its lower end in a horizontal base, a work table base united to the back rest by a horizontal pivot upon which the back rest is movable, means coöperating with the notches in the lower portion of the back rest to hold the back rest in either of its adjusted positions on the horizontal pivot, said means comprising a spring-pressed pivotal dog or detent, a saw guide arm having its upper end over-hanging the back rest, a supporting arm clamped to the saw guide arm and supporting the back rest and work table base by a pivotal connection with the horizontal base of the back rest and upon which connection the saw guide arm is adapted to be moved in arcs of a circle, means coöperating with the horizontal base of the back rest to hold the saw guide arm in position, a saw guide having slotted extended portions united at their upper ends, a tension screw connecting said extensions, and an adjustable screw connecting said saw guide extensions with the over-hanging portion of the saw guide arm.

4. In a miter box, a slotted back rest having a horizontal base with a pivot pin extending therefrom, a work table base united to the back rest by a horizontal pivot, a work table supported on said base, a clamping device adjustably connected with the work table base and adapted to support the outer portion of the work table, means for holding the back rest in either of its positions upon the horizontal pivot between it and the work table base, a saw guide arm having an overhanging upper end, a friction device, a supporting member adjustably connected to the saw guide arm by said friction device, said supporting member being connected to the pivot pin on the horizontal base of the back rest and whereby the saw guide arm is movable on a vertical pivot thus formed, means coöperating with the horizontal base of the back rest for locking the saw guide arm in position, a saw guide having slotted extensions, means for regulating the space between the saw guide members, and an adjusting screw penetrating the overhanging portion of the saw guide arm and the slotted extensions of the saw guide and by means of which the saw guide is adjustably supported on said over-hanging portion of the saw guide arm.

In testimony whereof I affix my signature in presence of two witnesses.

SAMUEL W. SHUE.

Witnesses:
R. J. McCarty,
C. M. Theobald.